US009567737B2

(12) United States Patent
McAlpine et al.

(10) Patent No.: US 9,567,737 B2
(45) Date of Patent: Feb. 14, 2017

(54) NON-RETURN DEVICE

(75) Inventors: James Edward McAlpine, Hillington (GB); James Kenneth McAlpine, Glasgow (GB)

(73) Assignee: MCALPINE & CO LIMITED, Hillington, Glasgow (GB)

(*) Notice: Subject to any disclaimer, the term of this patent is extended or adjusted under 35 U.S.C. 154(b) by 0 days.

(21) Appl. No.: 13/511,393

(22) PCT Filed: Nov. 23, 2010

(86) PCT No.: PCT/GB2010/002158
§ 371 (c)(1),
(2), (4) Date: Aug. 9, 2012

(87) PCT Pub. No.: WO2011/061515
PCT Pub. Date: May 26, 2011

(65) Prior Publication Data
US 2013/0000766 A1  Jan. 3, 2013

(30) Foreign Application Priority Data
Nov. 23, 2009  (GB) .................................. 0920084.1

(51) Int. Cl.
*F16K 15/14* (2006.01)
*E03D 13/00* (2006.01)
*E03C 1/298* (2006.01)

(52) U.S. Cl.
CPC .............. *E03D 13/00* (2013.01); *E03C 1/298* (2013.01); *F16K 15/147* (2013.01); *Y10T 137/7879* (2015.04)

(58) Field of Classification Search
CPC .................... Y10T 137/7879; Y10T 137/7898; F16K 15/147; E03D 13/00; E03C 1/298

USPC ................................................... 137/846, 847
See application file for complete search history.

(56) References Cited

U.S. PATENT DOCUMENTS

| 175,145 | A | * | 3/1876 | Painter | 137/850 |
| 3,967,645 | A | * | 7/1976 | Gregory | 137/846 |
| 4,524,805 | A | | 6/1985 | Hoffman | |
| 5,606,995 | A | * | 3/1997 | Raftis | 137/846 |
| 5,727,593 | A | * | 3/1998 | Duer | 137/846 |

FOREIGN PATENT DOCUMENTS

| DE | 20302114 U1 | 4/2003 |
| GB | 754497 A | 8/1956 |
| JP | 11-172736 A | 6/1999 |
| JP | 2004/124531 A | 4/2004 |
| WO | 2008/134808 A1 | 11/2008 |

OTHER PUBLICATIONS

International Preliminary Report on Patentability and Written Opinion, PCT/GB2010/002158, dated May 30, 2011.
International Search Report, PCT/GB2010/002158, dated May 27, 2011.

* cited by examiner

*Primary Examiner* — Kevin Lee
*Assistant Examiner* — P. Macade Nichols
(74) *Attorney, Agent, or Firm* — Buchanan Nipper

(57) ABSTRACT

A non-return device (10) for use with a waste trap is described. The non-return device comprises a sealing portion (12) having first and second sheet members (14, 16), a device inlet (18), a device outlet (20) and a transition portion (22) providing fluid communication between the device inlet and the sealing portion. The transition portion has a convex section of wall (24).

49 Claims, 1 Drawing Sheet

Fig 3

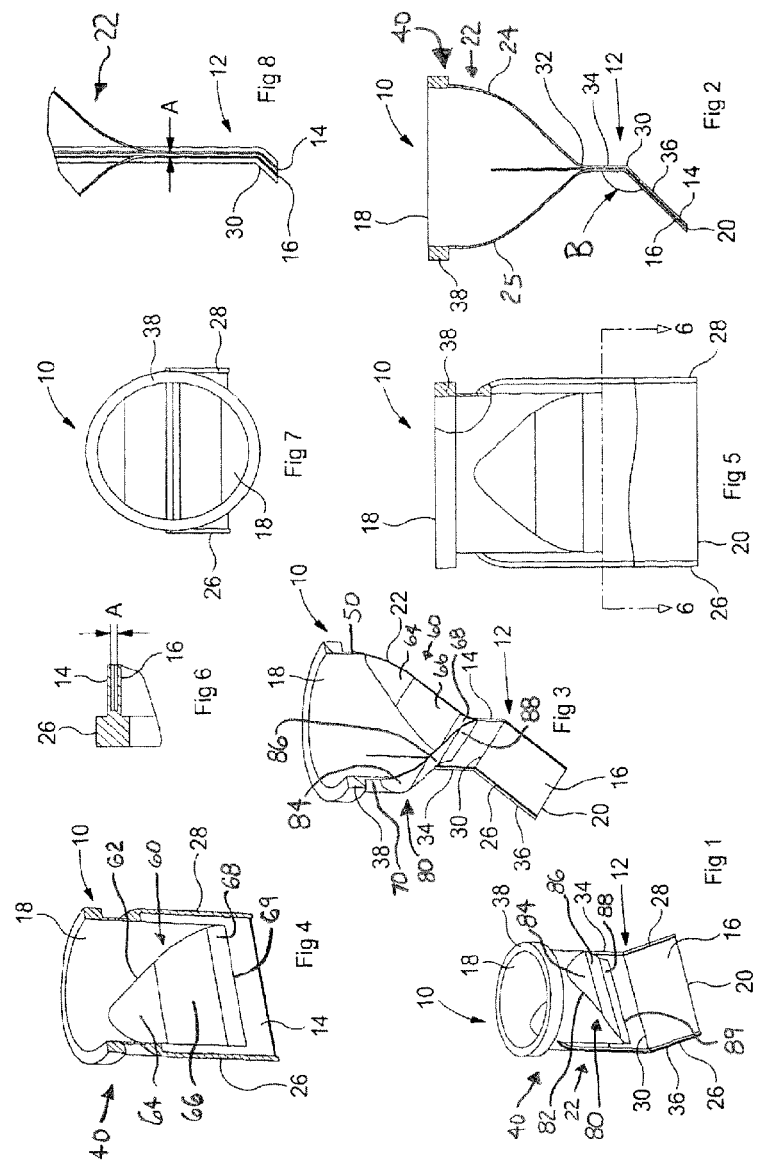

NON-RETURN DEVICE

FIELD OF THE INVENTION

The present invention relates to a non-return device. Particularly but not exclusively the present invention relates to a non-return device for use in liquid seal traps.

BACKGROUND TO THE INVENTION

Traps, such as bottle traps or convoluted pipes, are widely used throughout the world to connect waste fluid outlets from sinks, baths or showers or the like to a soil stack. A conventional trap comprises an inlet and an outlet, and defines a passageway for liquid to flow from the inlet to the outlet. A conventional trap is designed such that, in use, liquid is retained in the passageway to provide a barrier between the inlet and the outlet, preventing odours and gases from the soil stack passing through the trap into the surrounding environment.

Whilst conventional traps are fairly effective, there are drawbacks associated with them. It is known, for example, for the liquid seal to evaporate over a period of time, such that the gases in the soil stack are no longer prevented from escaping through the waste outlet. This is particularly a problem where the waste outlet is not used regularly and/or the trap is located in a hot or low humidity environment in which the rate of evaporation is increased.

It is also known for a siphon effect to be established in a trap causing the liquid in the trap to be sucked out of the trap, thereby breaking the liquid seal.

Non-return devices have been used in conjunction with soil traps to prevent odours from the soil stack passing through the trap in the event of the liquid seal being broken. One such device is described in GB2296309. However this device has drawbacks. For example the incorporation of such a non-return device may restrict the flow through the waste outlet and causing a build up of fluid in the vessel. This can be unsightly and prompt concern of a blockage in a user.

It is also known for conventional non-return devices to turn inside out when there is a pressure differential across the device resulting in a higher pressure on soil stack side of the non-return device, thereby negating the effect of the non-return device.

SUMMARY OF THE INVENTION

According to a first aspect of the present invention there is provided a non-return device for use with a waste trap, the non-return device comprising:
  a sealing portion having first and second sheet members;
  a device inlet;
  a device outlet; and
  a transition portion providing fluid communication between the device inlet and the sealing portion, the transition portion having a convex section of wall.

In one embodiment, providing a non-return device with a transition portion having a convex section of wall, allows fluid to build up in the immediate vicinity of the sealing portion, permitting a larger volume of fluid to be held by the device, resulting in a greater flow rate through the device. The convex shape is also resistant to turning inside out in response to a pressure differential across the device, as the pressure has to overcome the bias of the transition portion which is to a bowed out configuration.

The sheet members may be moveable from a sealed position, in which the members are at least partially in surface contact, to an open position, in which the members are forced apart by a flow of fluid flowing from the device inlet to the device outlet, the sheet members being biased to return to the sealed position from the open position such that fluid is prevented from flowing from the device outlet to the device inlet.

The non-return device may be moulded, for example injection moulded.

Alternatively, the non-return device may be compression moulded.

The inlet may be circular. A circular inlet facilitates installing the non-return device in pipes and other conventional fittings.

The inlet may be biased to an open position. Biasing the inlet to an open position ensures optimum performance of the device.

In one embodiment, the inlet may be stiffened. Stiffening the inlet assists in biasing the inlet to the open position.

The inlet may be a circular flange. Providing a circular flange stiffens the non-return device inlet, ensuring optimum performance.

The sheet members may define a flow path from the transition portion to the device outlet.

The sheet members may define the device outlet.

In one embodiment the flow path may be non-linear.

In this embodiment the sheet members may define at least one bend or kink.

In this embodiment the bend or kink may extend across the sheet members in direction perpendicular to the direction of the flow path. Such an arrangement provides a contact seal along the length of the bend or kink between the first and second sheet members.

In one embodiment there may be one kink.

The sealing portion may comprise a plurality of sealing portion sections, each sealing portion section being adjacent, a bend or kink.

Each sealing portion section may be linear.

In an embodiment where there is one kink, the angle between the sealing portion sections adjacent the kink may be between 110° or 170°.

In this embodiment, the angle may be between 120° to 160°.

In this embodiment the angle may be 135°.

At least a portion of each sheet member may be less than 0.5 mm thick

At least a portion of each sheet member may be less than 0.3 mm thick.

At least a portion of each sheet member may be 0.1 millimeters thick. Thinner sheet members provide improved sealing performance and reduce material costs.

The sheet member portion may be adjacent a sealing portion section.

In supplements, the sheet members may be a variable thickness. Thicker sections in the sheet members help avoid distortion.

The non-return device may comprise silicon.

The non-return device may, most preferably, comprise liquid silicon.

Each sheet member may comprise a first edge and a second edge, the edges being parallel to the flow path.

In one embodiment, the first sheet member first edge may be joined to the second sheet member first edge and the first sheet member second edge may be joined to the second sheet member second edge.

The sheet members may be biased to the sealed position by resilience.

In one embodiment the first and second sheet members may comprise at least one biasing member. Biasing members are provided to bring the sheet members together and assist in maintaining a seal.

Additionally or alternatively, the first and second sheet members may comprise at least one stiffening member. Stiffening members permit thinner material to be used for the sheet members and help resist the device turning inside out when exposed to a pressure differential, the higher pressure being on the outlet side of the non-return device.

In an embodiment, the biasing members and the stiffening members may be the same.

The biasing members and/or the stiffening members may be first and second ribs.

The first rib may connect the sheet member first edges and the second rib may connect the sheet member second edges.

The ribs may extend the full length of the sheet members.

The ribs may bias the first and second sheet members to the sealed position.

Each rib may be more than 50% of the thickness of each sheet member.

Each rib may be more than 50% thicker than the sheet members combined.

The ribs may extend up to the transition portion. The ribs also add stiffness to the transition portion and help resist the device turning inside out when exposed to a pressure differential, the higher pressure being on the outlet side of the non-return device.

In an embodiment where the device is injection moulded, the sealing portion may be moulded in a tool comprising a shell and a core.

The core may be 0.2 mm thick.

The core may include a highly polished surface portion.

The internal surface of the sealing portion may be formed against the highly polished surface portion. A highly polished core surface will provide a very smooth sealing portion internal surface. The smoother the surface, the more the surface material will "stick" to one another and improve the sealing properties of the seal.

In this embodiment, the moulding tool shell may also comprise a polished surface portion. The polished surface portion may also be in the region of the sealing portion.

According to a second aspect of the present invention, there is provided a non-return device for use with a waste trap, the non-return device comprising:

a sealing portion having first and second sheet members at least one sheet member comprising at least one stiffening member;

a device inlet;

a device outlet; and a transition portion providing fluid communication between the device inlet and the sealing portion.

In one embodiment, providing a stiffening member permits a thinner material to be used for the sheet members, which in turn improves the sealing properties of the sheet members. The stiffening members additionally help resist the device turning inside out when exposed to pressure differential, the higher pressure being on the outlet side of the non-return device.

The transition portion may have a convex section of wall.

According to a third aspect of the present invention, there is provided a non-return device for use with a waste trap, the non-return device comprising:

a sealing portion having first and second sheet members, at least one sheet member comprising at least one biasing member;

a device inlet;

a device outlet; and a transition portion providing fluid communication between the device inlet and the sealing portion.

In one embodiment, providing a biasing member to bias the bias the sheet members together further improves the sealing properties of the non-return device.

The transition portion may have a convex section of wall.

It will be understood that features listed as non-essential in respect of the first aspect may also be applicable to the second and third aspects and are not repeated for brevity.

BRIEF DESCRIPTION OF THE DRAWINGS

An embodiment of the present invention will now be described with reference to the accompanying drawings in which:

FIG. 1 is a perspective view of a non-return device according to a first embodiment of the present invention;

FIG. 2 is a side section view through the device of FIG. 1;

FIG. 3 is a cut away perspective view of the device of FIG. 1;

FIG. 4 is a cut away perspective view of part of the device of FIG. 1;

FIG. 5 is a partially cut away front view of the device of FIG. 1;

FIG. 6 is part of the section view marked 6-6 on FIG. 5;

FIG. 7 is a plan view of the device of FIG. 1; and

FIG. 8 is a close up section view of part of the device of FIG. 1.

DETAILED DESCRIPTION OF THE DRAWINGS

Referring to the Figures and particularly to FIGS. 1, 2, 3, 6 and 8, a non-return device, generally indicated by reference numeral 10 for use with a waste trap is shown. The non-return device 10 comprises a sealing portion 12, having first and second sheet members 14, 16, a tubular portion 40 comprising a device inlet 18, a device outlet 20 and the transition portion 22 providing fluid communication between the device inlet 18 and the sealing portion 12, the transition portion 22 having a convex wall section 24, 25 (best seen in FIG. 2). The tubular portion comprises a non-constant tubular length that depends on circumferential position around the tubular portion. The sheet numbers 14, 16 are moveable from a sealed position, as shown in FIGS. 1-8, to an open position (not shown) in which the members 14, 16 are forced apart by a flow of fluid flowing from the device inlet 18 to the device outlet 20, the sheet members 14, 16 being biased by resilience from the open position to the sealed position such that fluid in the opposite direction is prevented.

Providing a device 10 in which a section of the wall 24, 25 of the transition portion 22 is convex, allows for a build-up of fluid in at least one of tubular portion 40 and the transition portion 22, in the immediate vicinity of the sealing portion 12. This facilitates the opening of the sealing portion 12, by forcing the sheet members 14, 16 apart because the bowed-out nature of the transition portion 22 facilitates opening of the sealed portion 12. If, for example, the transition portion wall section 24 had a concave profile, that is it is curved inwards, the weight of fluid has to overcome the natural bias of such a shape before fluid can flow through the device 10. Furthermore, the greater the volume of fluid which is contained within the transition portion 22, the lower the volume of fluid which remains within, for example, the urinal, with the result that when used, there is less possibility of a user thinking the urinal is blocked. Furthermore the convex wall section 24 has a natural bias away from the direction of flow through the device 10 which has to be overcome by a pressure from below the device 10 which may be acting to turn the device 10 inside out in the event of a pressure differential existing across the device 10.

The transition portion 22 further comprises a first transition portion 60 extending between a first side 50 of the tubular portion 40 and the first sheet member 14, and a second transition portion 80 extending between a second side 70 of the tubular portion 40 and the second sheet member 16. Each of the first and second transition portions 60, 80 comprise a boundary 62, 82 defining a perimeter of the transition portion 60, 80, the boundary 62, 82 comprising a tubular portion transition 64, 84 between the tubular portion 40 and the transition portion 60, 80, and a sealing portion transition 69, 89 between the transition portion 60, 80 and the sealing portion 12. Wherein in use, fluid build-up between the first and second transition portions 60, 80 forces the first and second sheet members 14, 16 apart to the open position to allow fluid to exit the sealing portion 12 via the device outlet 20.

At least part of the tubular portion 40 extends between at least part of the sealing portion transition 69, 89 and the device inlet 18, wherein the tubular length extending between the device inlet 18 and the sealing portion transition 69, 89 is greater than the tubular length extending between at least part of the device inlet 18 and a corresponding part of the tubular portion transition 64, 84. The tubular portion 40 comprises a plurality of different tubular lengths extending axially between the device inlet 18 and at least one of: the tubular portion transition 64, 84 and the sealing portion transition 69, 89. Each transition portion 60, 80 further comprises a concave section of wall 68, 88, and the sealing portion transition 69, 89 can comprise at least a portion of the concave section of wall 68, 88. The convex section of wall 24, 25 is disposed between the concave section of wall 68, 88 and the tubular portion transition 64, 84. Each transition portion 60, 80 comprises a planar section of wall 66, 86 between the concave section of wall 68, 88 and the convex section of wall 24, 25.

The first and second sheet members 14, 16 are joined at their edges by the first and second ribs 26, 28. Referring to FIG. 6, each rib 26 has a square cross section 1 mm×1 mm. FIG. 6 also most clearly shows the sheet members 14, 16 which are 0.1 mm thick.

The device 10 is injection moulded and a tool (not shown) comprising two shells and a central core. The central core is 0.2 mm thick indicated by letter "A" on FIGS. 6 and 8. The provision of the ribs 26, 28 stiffen the sealing portion 12, permitting a thin material to be used for the sheet members 14, 16. A thin material provides improved sealing properties, reduces cost and has less resistance to the fluid flowing through the device 10 from the inlet 18 to the outlet 20. The ribs 26 also act to bias the sheet members 14, 16 together.

The sealing portion 12 also incorporates a kink 30 transverse to the direction of fluid flow through the device 10. The kink 30 forces a contact seal between the sheet members 14, 16. Referring to FIG. 2, there are three main contact points between the sheet members 14, 16; at the kink 30, at the outlet 20, and at the entry 32 to the sealing portion 12.

The kink 30 is located between a first sealing portion section 34 and a second sealing portion section 36, the first and second sealing portion sections 34, 36 being linear and arranged at an angle indicated by letter "B" on FIG. 2 of 135°.

The device inlet 18 is defined by an inlet flange 38. The inlet flange 38 acts to hold the device 10 open and provides an engagement portion for engaging the device 10 with a trap (not shown).

Various modifications and improvements could be made to the above described embodiment without departing from the scope of the invention. For example, although the device 10 is shown with only one kink, two or more kinks could be incorporated, a two kink device having a flow path through the sealing portion which could be S-shaped or could be U-shape.

The invention claimed is:

1. A non-return device, the non-return device comprising:
a sealing portion having first and second sheet members biased to a sealed position in which the first and second sheet members are at least partially in surface contact;
a tubular portion comprising a device inlet, wherein the tubular portion comprises a non-constant tubular length that depends on a circumferential position around the tubular portion, wherein the device inlet is a circular flange defining a circular opening, the circular flange comprising a thickened portion and acting to hold the device inlet open;
a device outlet; and
a transition portion providing fluid communication between the device inlet, the tubular portion and the sealing portion, the transition portion having a bowed-out convex section of wall for allowing a build-up of fluid within the non-return device in the transition portion in an immediate vicinity of the sealing portion;
wherein in use, the device outlet is oriented in a downwards position relative to the device inlet and fluid build-up in at least one of: the tubular portion and the transition portion forces the first and second sheet members apart to an open position; and
wherein the non-return device is a waste trap non-return device.

2. The non-return device of claim 1, wherein the sheet members are moveable from the sealed position to the open position, in which the sheet members are forced apart by a flow of fluid flowing from the device inlet to the device outlet, the sheet members being biased to return to the sealed position from the open position such that fluid is prevented from flowing from the device outlet to the device inlet.

3. The non-return device of claim 2, wherein the sheet members are biased to the sealed position by resilience.

4. The non-return device of claim 1, wherein the non-return device is injection moulded.

5. The non-return device of claim 1, wherein the non-return device is compression moulded.

6. The non-return device of claim 1, wherein the device inlet is biased to an open position.

7. The non-return device of claim 1, wherein the sheet members define a flow path from the transition portion to the device outlet.

8. The non-return device of claim 7, wherein the flow path is non-linear.

9. The non-return device of claim 1, wherein the sheet members define the device outlet.

10. The non-return device of claim 1, wherein the sheet members define at least one bend or kink.

11. The non-return device of claim 10, wherein the sheet members define a flow path from the transition portion to the device outlet, and wherein the bend or kink extends across the sheet members in a direction perpendicular to a direction of the flow path.

12. The non-return device of claim 10, wherein there is one kink.

13. The non-return device of claim 10, wherein the sealing portion comprises a plurality of sealing portion sections, each sealing portion section being adjacent, a bend or kink.

14. The non-return device of claim 13, wherein each sealing portion section is linear.

15. The non-return device of claim 13, wherein, where there is one kink, an angle between the sealing portion sections adjacent the kink is between 110° and 170°.

16. The non-return device of claim 13, wherein at least a portion of each sheet member is less than 0.5 mm thick.

17. The non-return device of claim 16, wherein the sheet member portion of each sheet member is adjacent a sealing portion section.

18. The non-return device of claim 1, wherein the sheet members are a variable thickness.

19. The non-return device of claim 1, wherein the non-return device comprises silicone.

20. The non-return device of claim 7, wherein each sheet member comprises a first edge and a second edge, the edges being parallel to the flow path.

21. The non-return device of claim 20, wherein the first sheet member first edge is joined to the second sheet member first edge and the first sheet member second edge is joined to the second sheet member second edge.

22. The non-return device of claim 1, wherein the first and second sheet members comprise at least one biasing member.

23. The non-return device of claim 22, wherein the first and second sheet members comprise at least one stiffening member.

24. The non-return device of claim 23, wherein the biasing members and the stiffening members are the same.

25. The non-return device of claim 22, wherein at least one of: the biasing members and stiffening members are first and second ribs.

26. The non-return device of claim 25, wherein the first rib connects the sheet member first edges and the second rib connects the sheet member second edges.

27. The non-return device of claim 26, wherein the ribs extend a full length of the sheet members.

28. The non-return device of claim 26, wherein the ribs bias the first and second sheet members to the sealed position.

29. The non-return device of claim 25, wherein each rib is more than 50% of a thickness of each sheet member.

30. The non-return device of claim 25, wherein each rib is more than 50% thicker than the sheet members combined.

31. The non-return device of claim 25, wherein the ribs extend up to the transition portion.

32. The non-return device of claim 25, wherein stiffening members are formed from a same material as the sheet members.

33. The non-return device of claim 1, wherein the sealing portion is injection moulded in a tool comprising a shell and a core.

34. The non-return device of claim 33, wherein the core is 0.2 mm thick.

35. The non-return device of claim 33, wherein the core includes a highly polished surface portion.

36. The non-return device of claim 35, wherein the sealing portion comprises an internal surface, and wherein the internal surface of the sealing portion is formed against the highly polished surface portion.

37. The non-return device of claim 33, wherein the moulding tool shell also comprises a polished surface portion.

38. The non-return device of claim 37, wherein the polished surface portion is in a region of the sealing portion.

39. The non-return device of claim 1, wherein the transition portion comprises:
a first transition portion extending between a first side of the tubular portion and the first sheet member; and
a second transition portion extending between a second side of the tubular portion and the second sheet member,
wherein each of the first and second transition portions comprise a boundary defining a perimeter of the transition portion, the boundary comprising:
a tubular portion transition between the tubular portion and the transition portion; and
a sealing portion transition between the transition portion and the sealing portion,
wherein in use, fluid build-up between the first and second transition portions forces the first and second sheet members apart to the open position to allow fluid to exit the sealing portion via the device outlet.

40. The non-return device of claim 39, wherein the sealing portion, the tubular portion comprising the device inlet, the device outlet and the transition portion are formed from a same material.

41. The non-return device of claim 39, wherein at least part of the tubular portion extends between at least part of the sealing portion transition and the device inlet, wherein the tubular length extending between the device inlet and the sealing portion transition is greater than the tubular length extending between at least part of the device inlet and a corresponding part of the tubular portion transition.

42. The non-return device of claim 39, wherein the tubular portion comprises a plurality of different tubular lengths extending axially between the device inlet and at least one of: the tubular portion transition and the sealing portion transition.

43. The non-return device of claim 39, wherein each transition portion further comprises a concave section of wall.

44. The non-return device of claim 43, wherein the sealing portion transition comprises at least a portion of the concave section of wall.

45. The non-return device of claim 43, wherein the convex section of wall is disposed between the concave section of wall and the tubular portion transition.

46. The non-return device of claim 43, wherein each transition portion comprises a planar section of wall between the concave section of wall and the convex section of wall.

47. The non-return device of claim 1, wherein the sealing portion, the tubular portion comprising the device inlet, the device outlet and the transition portion are formed from a same material.

48. A non-return device, the non-return device comprising:
a sealing portion having first and second sheet members at least one sheet member comprising at least one stiffening member biasing the first and second sheet members to a sealed position in which the first and second sheet members are at least partially in surface contact;
a tubular portion comprising a device inlet, wherein the tubular portion comprises a non-constant tubular length that depends on a circumferential position around the tubular portion, wherein the device inlet is a circular flange defining a circular opening, the circular flange comprising a thickened portion and acting to hold the device inlet open;

a device outlet; and a transition portion providing fluid communication between the device inlet, the tubular portion and the sealing portion, the transition portion having a bowed-out convex section of wall for allowing a build-up of fluid within the non-return device in the transition portion in an immediate vicinity of the sealing portion;

wherein in use, the device outlet is oriented in a downwards position relative to the device inlet and fluid build-up in at least one of: the tubular portion and the transition portion forces the first and second sheet members apart to an open position;

wherein at least a portion of each sheet member is less than 0.5 mm thick; and wherein the non-return device is a waste trap non-return device.

49. A non-return device, the non-return device comprising:

a sealing portion having first and second sheet members, at least one sheet member comprising at least one biasing member biasing the first and second sheet members to a sealed position in which the first and second sheet members are at least partially in surface contact;

a tubular portion comprising a device inlet, wherein the tubular portion comprises a non-constant tubular length that depends on a circumferential position around the tubular portion, wherein the device inlet is a circular flange defining a circular opening, the circular flange comprising a thickened portion and acting to hold the device inlet open;

a device outlet; and a transition portion providing fluid communication between the device inlet, the tubular portion and the sealing portion, the transition portion having a bowed-out convex section of wall for allowing a build-up of fluid within the non-return device in the transition portion immediately above the sealing portion;

wherein in use, the device outlet is oriented in a downwards position relative to the device inlet and fluid build-up in at least one of: the tubular portion and the transition portion forces the first and second sheet members apart to an open position; and wherein the non-return device is a waste trap non-return device.

* * * * *